United States Patent Office 2,933,857
Patented Apr. 26, 1960

2,933,857

METHOD OF MAKING A SEMICRYSTALLINE CERAMIC BODY

Stanley D. Stookey, Corning, N.Y., assignor to Corning Glass Works, Corning, N.Y., a corporation of New York No Drawing. Application December 15, 1958
Serial No. 780,238

4 Claims. (Cl. 49—77)

This invention relates to the manufacture of semicrystalline ceramic bodies by the controlled crystallization by heat treatment of glass bodies and has for its primary object an improved method of heat treatment which is not dependent upon the presence in the glass of a nucleating or crystallization promoting agent.

Another object is to provide semicrystalline bodies by such improved method which have high silica contents and unusually high thermal expansion coefficients.

The semicrystalline bodies produced by the new method have thermal expansion coefficients above $175 \times 10^{-7}$ per ° C., between 0° and 300° C., and, if desired, have a glassy surface layer of substantially lower expansion coefficient, self-formed while the body is at an elevated temperature, whereby the resulting compressive surface stress at ordinary temperatures provides the body with a high modulus of rupture. Such bodies are particularly suited for tableware because of their inherent high strength and smooth glassy surfaces which do not show objectionable knife marks from contacts with knives used for cutting food thereon. They also are useful for conjunction with high expansion metals and alloys such as aluminum, copper, brass and the like.

Broadly the new method according to the invention comprises heat treating a glass body comprising 85–92% $SiO_2$, 6.5–15% $Na_2O$ and/or $K_2O$, 0–8% $Al_2O_3$ and 0–5% F, the total $SiO_2$, $Na_2O$ and $K_2O$ amounting to at least 92%, by heating it between 650° and 1250° C. until its linear thermal expansion coefficient has increased to above $175 \times 10^{-7}$ per ° C., between 0° and 300° C.

The invention is predicated upon my discovery that, when such compositions are heat treated as described, finely crystalline cristobalite and/or tridymite are formed as a uniform dispersion in a matrix of the residual glass. In general, cristobalite is the principal crystalline phase, if the temperature of heat treatment does not exceed about 900° C. for any substantial time; and tridymite is the principal crystalline phase, if the temperature of heat treatment is at about 900° C. or above for a substantial time. If the temperature of heat treatment is maintained substantially above 900° C. long enough, say a least 2 hours, the principal crystalline phase will be substantially solely tridymite, any cristobalite which may have formed being converted to tridymite under these conditions. The expansion coefficients of these two crystalline forms of silica are quite high, that of cristobalite being higher than that of tridymite. When the principal crystalline phase is cristobalite the expansion coefficient of the semicrystalline body is greater than $300 \times 10^{-7}$ per ° C. and when the principal crystalline phase is tridymite its expansion coefficient is between $175 \times 10^{-7}$ and $280 \times 10^{-7}$ per ° C. between 0° and 300° C.

When fluorine is present in the composition it forms crystals of NaF and/or KF at temperatures below about 900° C. Such crystallization occurs when the glass is first cooled and before the principal phase has been formed by subsequent heat treatment. Such crystals usually are visible as a slight opalescence in the glass and, after the subsequent crystallization of the principal phase, they constitute a minor phase in the semicrystalline body. There is no evidence that such minor phase has an crystallization-promoting effect.

Fluorine, which usually is introduced into the batch as an alkali metal compound, has as its functions to promote melting of the composition and to aid in providing the semicrystalline body with a self-formed surface glaze, the advantages of which have been pointed out above. Such self-glazing occurs automatically when the body is heated substantially above 900° C. It is believed that the alkali metal fluoride, which has previously crystallized at lower temperatures throughout the body, redissolves in the glassy matrix at temperatures above 900° C. and that such action in the surface of the body forms an external glaze thereon having a lower expansion coefficient than that of the body per se and effectively submerging the crystalline phase or phases beneath such glaze. If desired, the same result may be obtained independently of the presence or absence of fluorine by applying to the surface of the body by known enamelling technique a glaze composition having an expansion coefficient suitably lower than that of the body.

Compositions within the above range which may be utilized in carrying out the invention are illusrtated by the batches of Table I which are stated in parts by weight.

Table I

|  | 1 | 2 | 3 | 4 | 5 | 6 |
|---|---|---|---|---|---|---|
| Sand | 435 | 990 | 1,004 | 1,030 | 1,030 | 1,050 |
| $Na_2CO_3$ | 16 | 52 | 50 |  | 100 | 148 |
| $NaNO_3$ | 14 |  |  |  | 62 | 26 |
| NaF | 45 |  | 132 | 132 |  |  |
| $Na_3AlF_6$ |  | 132 |  |  |  |  |
| $Al_2O_3$ | 20 | 48 | 24 | 24 |  | 25 |
| Dolomite |  |  |  |  |  | 37 |
| $As_2O_3$ |  |  |  |  | 4.8 |  |

|  | 7 | 8 | 9 | 10 | 11 | 12 | 13 |
|---|---|---|---|---|---|---|---|
| Sand | 514 | 525 | 538 | 514 | 525 | 538 | 519 |
| $Na_2CO_3$ | 139 | 118 | 98 | 55 | 35 | 14 |  |
| $NaNO_3$ | 16.5 | 16.5 | 16.5 | 16.5 | 16.5 | 16.5 |  |
| NaF |  |  |  | 66 | 66 | 66 |  |
| KF |  |  |  |  |  |  | 92 |
| $K_2CO_3$ |  |  |  |  |  |  |  |
| $KNO_3$ |  |  |  |  |  |  | 13 |
| $As_2O_3$ | 3.6 | 3.6 | 3.6 | 3.6 | 3.6 | 3.6 | 3.6 |

To obtain homogeneous glasses, the batches are melted at 1400° C. or higher for at least 4 hours in pots, crucibles or tanks depending upon the size of the melt. An oxidizing agent such as $NaNO_3$ or $KNO_3$ is preferably contained in the batch and, if desired, a fining agent such as $As_2O_3$ is also added. The amount of $As_2O_3$ remaining in the glass has no material effect upon its fundamental characteristics and, since the residual amount thereof is practically negligible, it is disregarded in further computations herein.

The exact compositions of fluorine-containing glasses cannot be calculated with accuracy on the conventional oxide basis from their batches because a substantial amount of the fluorine is lost by volatilization during melting. The exact percentage of fluorine remaining in the glass can be determined by analysis but is customarily stated separately from the oxide composition. Analyses of fluorine-containing soda-alumina-silicate glasses of the present type show that about 70% of the fluorine remains in the glass.

The above batches, on being melted, result in the respective glass compositions shown in Table II and calculated in weight percent on the oxide basis, the corrected amount of fluorine being stated separately for convenience as 70% of the calculated amount, as referred to above. The accuracy of this procedure is sufficient for defining the compositions which are suitable for the present purpose.

Table II

|         | 1    | 2    | 3    | 4    | 5    | 6   |
|---------|------|------|------|------|------|-----|
| $SiO_2$ | 86.5 | 85.5 | 87   | 89.5 | 92.5 | 87  |
| $Na_2O$ | 9.5  | 7.5  | 11   | 8.5  | 7.5  | 8   |
| $Al_2O_3$ | 4.0 | 7.0 | 2    | 2.0  |      | 2   |
| CaO.MgO |      |      |      |      |      | 3   |
| F       | 2.8  | 4.3  | 3.6  | 3.6  |      |     |

|         | 7    | 8    | 9    | 10   | 11   | 12   | 13   |
|---------|------|------|------|------|------|------|------|
| $SiO_2$ | 85.5 | 87.5 | 89.5 | 85.5 | 87.5 | 89.5 | 86.5 |
| $Na_2O$ | 14.5 | 12.5 | 10.5 | 14.5 | 12.5 | 10.5 |      |
| $K_2O$  |      |      |      |      |      |      | 13.5 |
| F       |      |      |      | 3.5  | 3.5  | 3.5  | 3.5  |

The modulus of rupture is measured by supporting individual rods of the semicrystalline product, about ¼ inch in diameter and 4 inches long, on 2 knife edges spaced 3½ inches apart and individually loading them on 2 downwardly acting knife edges about ¾ inch apart and centrally spaced from the lower knife edges until breakage of the rods occurs. To make the results more comparable, the rods are first abraded by being rolled in a ball mill for 15 minutes with 30 grit silicon carbide. Ordinarily, five or more rods are thus tested to obtain the average value which is calculated in p.s.i. Abraded rods of glass in general, when measured in this manner, show moduli of rupture ranging from 5,000 to 6,000 p.s.i.

On account of the large amount of time involved in the determination of the physical properties of the glasses and the semicrystalline products some of the properties were not measured; but where the physical properties have been measured, those properties are given. Even in those cases where the properties are not given, however, the examples represent actual compositions which were compounded, melted to glasses, and treated in accordance with the teachings herein set forth; and the resulting products had the characteristics of the desired ceramics.

Table III

| | Glass | | Heated | | | | Ceramic | | | |
|---|---|---|---|---|---|---|---|---|---|---|
| No. | Expn. $\times 10^7$ | Sp. Gr. | °C. | Hr. | °C. | Hr. | Expn. $\times 10^7$ | Sp. Gr. | p.s.i. | phase |
| 1 | 50 |  | 720 / 950 | 1 / 2 | 820 / 1,150 | 1 / 5 |  |  | 21,900 | trid. |
| 2 |  |  | 820 / 1,150 | 1 / 5 | 950 | 1 |  |  | 31,570 | trid. |
| 3 | 56 |  | 720 | 2 | 975 | 4 | 236 |  | 18,150 | trid. |
| 3 | 56 |  | 720 | 2 | 840 | 5 | 306 |  | 10,520 | crist. |
| 4 | 37 | 2.2694 | 680 | 8 |  |  | >316 | 2.3489 | 11,700 | crist. |
| 4 | 37 | 2.2694 | 720 | .5 |  |  | >316 | 2.3477 | 11,330 | crist. |
| 4 | 37 | 2.2694 | 720 | 2 |  |  | >316 | 2.3471 | 10,700 | crist. |
| 4 | 37 | 2.2694 | 720 | 2 | 890 | 1 | >316 | 2.3403 | 17,740 | crist. |
| 4 | 37 | 2.2694 | 720 | 2 | 975 | 4 | 267 |  | 20,000 | trid. |
| 5 | 41 |  | 720 | 3 | 900 | 10 | 261 | 2.3123 |  | trid. |
| 6 | 48 | 2.2970 | 960 | 2 | 1,150 | 4 | 218 | 2.3221 | 12,600 | trid. |
| 7 | 76 | 2.344 | 720 | 2 | 900 | 8 | 177 | 2.367 | 9,950 | trid. |
| 8 | 66 | 2.323 | 720 | 2 | 900 | 8 | 191 | 2.352 | 10,140 | trid. |
| 9 | 56 | 2.308 | 720 | 2 | 900 | 8 | 209 | 2.347 | 11,350 | trid. |
| 10 | 66 | 2.319 | 720 | 2 | 900 | 8 | 218 | 2.334 | 22,000 | trid. |
| 11 | 58 | 2.312 | 720 | 2 | 900 | 8 | 223 | 2.326 | 20,280 | trid. |
| 12 |  |  | 720 | 2 | 900 | 8 | 244 | 2.299 | 14,210 | trid. |
| 13 | 43 | 2.282 | 720 | 2 | 900 | 8 | 224 | 2.294 | 14,780 | trid. |

The hereinbefore recited range of constituents of the glasses which are suitable for the practice of this invention is critical for the following reasons: An excess of $SiO_2$ over the stated amount or a deficiency of alkali metal oxide makes the glass too viscous for practical melting at the temperatures which are compatible with presently obtainable refractories. On the other hand, compositions which contain a deficiency of $SiO_2$ or an excess of alkali metal oxide result in glasses which do not crystallize when subjected to the described heat treatments. While $Al_2O_3$ is not an essential constituent of the recited range, it has a beneficial effect in that it increases the chemical stability of the glasses and the semicrystalline products. Compositions containing 1.5% but not more than about 8% of $Al_2O_3$ are, therefore, preferred. More than about 8% $Al_2O_3$ prevents satisfactory crystallization of the glass.

In Table III are shown the expansion coefficients per ° C. between 0° and 300° C. in whole units (Expn.$\times 10^7$) and specific gravities (Sp. Gr.) of the glasses of Table II together with the expansion coefficients, specific gravities, moduli of rupture (p.s.i.) and principal crystalline phase of their corresponding semicrystalline products and the respective heat treatments used in converting the glasses thereto.

From the data of Table III, and particularly that of composition No. 4, it will be seen that, when the temperature of heat treatment does not substantially exceed 900° C. for a substantial time, the expansion coefficient of the semicrystalline product is above $300 \times 10^{-7}$ per ° C. and the principal crystalline phase is cristobalite but when the temperature of heat treatment substantially exceeds 900° C. for a substantial time the expansion coefficient of the semicrystalline product is between $175 \times 10^{-7}$ and $280 \times 10^{-7}$ per ° C. and the principal crystalline phase is tridymite.

Part of the large thermal expansion coefficient of the semicrystalline product of the heat treatment below 900° C. is caused by the inversion of cristobalite which occurs in the neighborhood of 200°–275° C. and is accompanied by a sudden decrease in density. A similar but much smaller change in density is caused by the inversion of tridymite which occurs in the neighborhood of 117°–163° C. Such inversions sometimes cause breakage of bodies containing a large proportion of coarsely crystalline cristobalite and/or tridymite. The semicrystalline bodies of this invention have an extremely fine and uniform crystalline structure and are able to withstand such sudden expansion or shrinking.

What is claimed is:

1. The method of making a semicrystalline ceramic body having a high thermal expansion coefficient, which comprises heat treating a glass body comprising 85–92% $SiO_2$, 6.5–15% at least one of the alkali metal oxides $Na_2O$ and $K_2O$, 0.8% $Al_2O_3$ and 0–5% F by weight, the total $SiO_2+Na_2O+K_2O$ amounting to at least 92%, by heating it between 650° C. and 1250° C. until its linear thermal expansion coefficient has increased to above $175 \times 10^{-7}$ per ° C., between 0° and 300° C.

2. The method of claim 1 in which the glass body is heated between 650° C. and about 900° C. until its expansion coefficient is above $300 \times 10^{-7}$ per ° C., at 0°–300° C.

3. The method of claim 1 in which the glass body is heated above 900° C. until its expansion coefficient is between $175 \times 10^{-7}$ and $280 \times 10^{-7}$ per ° C. at 0°–300° C.

4. The method of claim 3 in which the glass contains 2–5% F.

References Cited in the file of this patent

UNITED STATES PATENTS

| | | |
|---|---|---|
| 1,932,202 | Coleman et al. | Oct. 24, 1933 |

FOREIGN PATENTS

| | | |
|---|---|---|
| 444,532 | Great Britain | Mar. 23, 1936 |

OTHER REFERENCES

Mellor: Comprehensive Treatise on Inorganic and Theoretical Chemistry, published 1925, vol. 6, pages 237–242, 252–254.